Oct. 13, 1931.   B. H. MORGAN ET AL   1,827,600
AIR COOLED INTERNAL COMBUSTION ENGINE
Filed May 19, 1930   2 Sheets-Sheet 1

INVENTORS
B. H. MORGAN
G. F. JONES
BY [signature] ATTY.

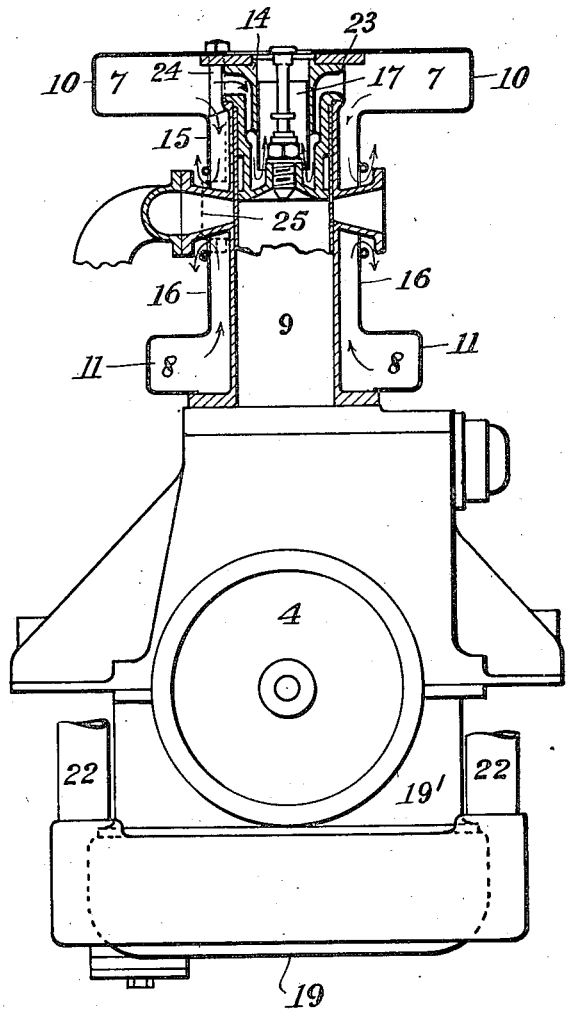

Patented Oct. 13, 1931

1,827,600

UNITED STATES PATENT OFFICE

BENJAMIN HOWELL MORGAN AND GEORGE FREDERICK JONES, OF WESTMINSTER, LONDON, ENGLAND

AIR-COOLED INTERNAL COMBUSTION ENGINE

Application filed May 19, 1930, Serial No. 453,742, and in Great Britain November 22, 1929.

This invention relates to air-cooled internal combustion engines, and whilst it is applicable to various forms of such engines it is particularly suitable for those of the sleeve valve and overhead valve types.

Distinctive features of the invention are that the cooling air is passed into distributing passages and from these is directed to the walls and the heads of the cylinders. The air so directed is preferably first introduced to relatively cool parts of the engine and then to hotter parts before escaping to the atmosphere; the entrances and exits being largely of streamline formation.

The distributing passages may be made in any convenient manner but with an engine having vertical cylinders the air is preferably introduced to a fan through a box having fixed guide blades which direct the air to the fan by which it is impelled into passages arranged alongside the upper and lower walls or ends respectively of the cylinders.

The passages alongside the upper walls direct part of the air against the outside of the said upper walls and part to the heads of the cylinders, while the air impelled along the lower distributing passages is led to the lower parts of the walls of the cylinders. The walls of the cylinders are provided with axial heat-conducting fins or ribs and are arranged in a casing so that the air introduced at the top will pass downwardly and the air from the lower passages will pass upwardly in the case of an engine having vertical cylinders and correspondingly in an engine having horizontal cylinders. The upper ribs and the lower ribs are divided from each other as by deflecting plates 9' which guide the air away perferably adjacent the induction and exhaust ports.

The air impelled to the heads of the cylinders is passed into intimate contact therewith and in the case of sleeve valve engines the air first passes downwardly alongside the walls of the head and then upwardly into the atmosphere. The inner and outer walls of the head may be connected together by radial heat-conducting ribs in the air passage.

The fan is preferably of the axial type with streamlined blades and is driven in any convenient way, as by a belt or gearing with means for adjusting the speed. A centrifugal type fan may however be used.

As the heated air passes from the walls of the cylinders in the neighbourhood of the induction pipes it heats the same and performs the same function as the usual water jacket.

An upright four cylinder sleeve valve engine with air cooling in accordance with our invention is illustrated by way of example in the accompanying drawings wherein:—

Fig. 3 is an end elevation of the said engine partly in section.

Figure 1:
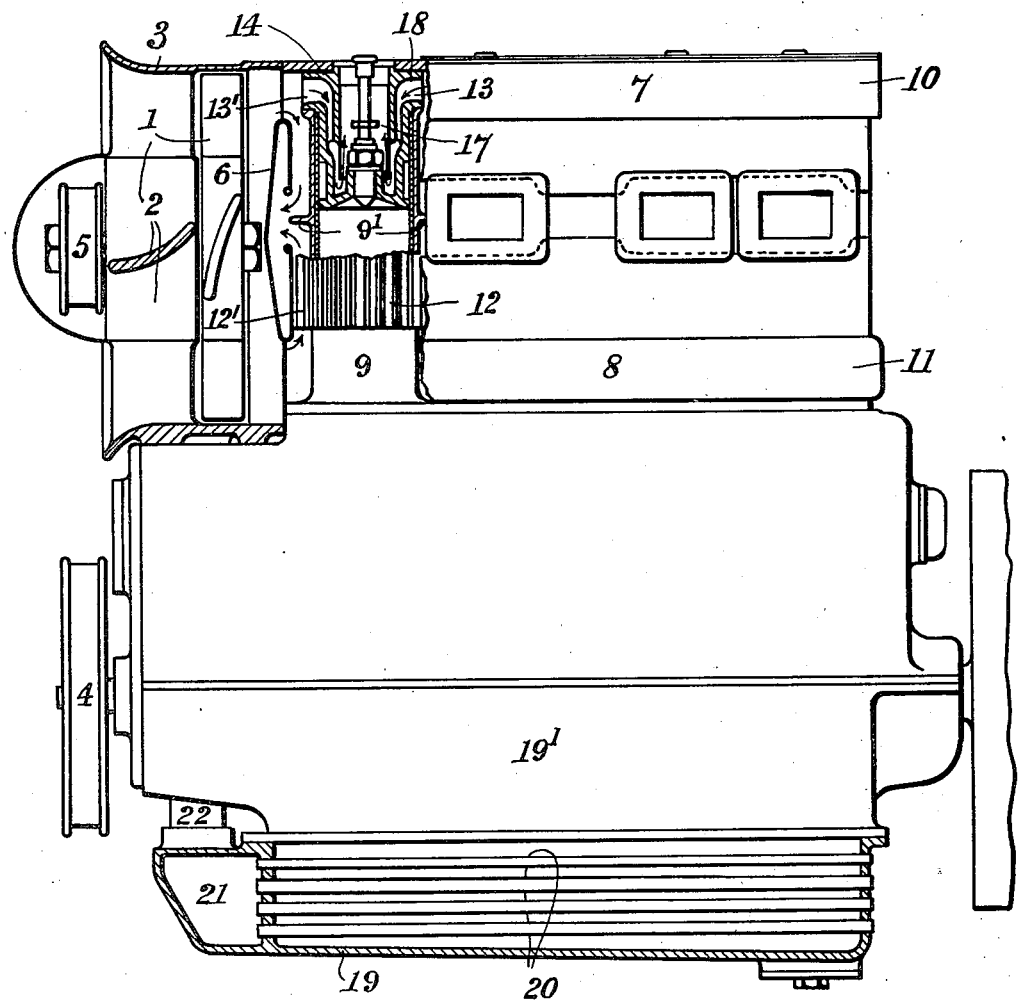
Fig. 1 is a side elevation with part of one cylinder, the box containing the fan, and the oil sump, in section.
Figure 2:
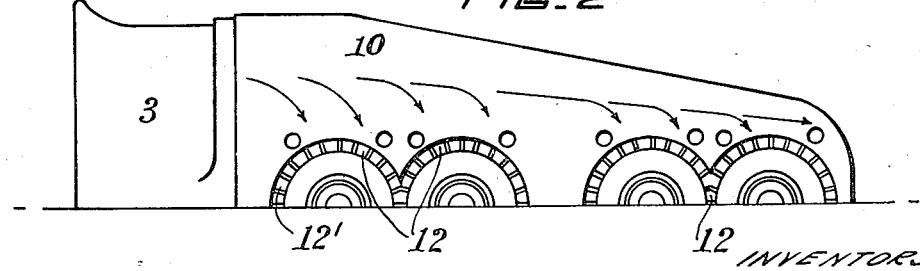
Fig. 2 is a part plan view of the engine according to Fig. 1.

In this example the fan or blower 1 when driven produces an axial and inward flow of air that passes to the fan without shock by virtue of its first striking fixed guide blades 2 which support the fan shaft and together with the fan are arranged within a box or casing 3. The fan in this example is driven from the crank shaft by a transmission which includes pulleys 4 and 5 and a belt, not shown. The transmission may however be of any suitable form.

After passing from the fan most of the air is diverted by a hollow open-ended baffle 6 into four passages 7—7 and 8—8 extending alongside the upper and lower ends respectively of the four cylinders 9 and formed by appropriately shaped jackets 10—10 and 11—11. The passages 7—7 and 8—8 direct the air onto vertical fins 12 on the cylinders and into downwardly directed streamlined passages 13 around the cylinder heads 14.

The air directed onto the fins passes between them towards baffles 9' in about the middle horizontal plane of the cylinders and escapes to atmosphere around the edges of skirts 15 and 16 on the jackets 10 and 11. That air on the induction manifold side of the engine heats the said manifold and acts in substantially the same way as the usual water jacket on water cooled engines.

The air directed into the passages 13 cools the head and escapes to atmosphere after passing around the lower end of a sleeve 17 that controls the rate of flow of the air. These passages contain heat radiating fins 18.

In order to provide for the adequate cooling of the front of the cylinder nearest the fan the baffle 6 causes some of the air from the fan to pass through passages 13′ and between fins 12′ in the manner above described with reference to 13 and 12; this air however passes into the hollow of the baffle 6, which extends transversely of the box 3, and escapes therefrom.

The oil sump consists of a casting 19 secured to the crank case 19′ and containing tubes 20 that extend from end to end of the casting and open to the atmosphere at one end and at their other end open into a chamber 21. Cooling air is conducted from the fan into the chamber by vertical pipes 22—22 appropriately connected with the box 3 and in passing through the tubes 20 cools them and thus the oil in the sump. The oil cooler may be apart from the engine if desired.

The heads are preferably fixed to the cylinders by steel plates 23 and bolts 24 which are anchored to the cylinder by passing through bosses such as 25 formed in the induction and exhaust ports; by this means minimum obstruction to the flow of air is obtained and strong and light connections between the heads and cylinders are obtained.

The casings or jackets 10 and 11 may be of aluminium and be easily detachable to facilitate cleaning.

If desired the flow of air past the cylinder walls may be controlled at any parts to adjust the cooling effect.

What we claim is:—

1. In an air-cooled internal combustion engine, the combination of members providing air passages one at each side of the upper ends of the engine cylinders, members providing air passages one at each side of the lower ends of the engine cylinders, and other members providing passages in communication with the said air passages and extending inwardly from the ends of the engine cylinders so as to direct air from the said air passages longitudinally of the engine cylinders and in contact with the cylinder walls.

2. In an air-cooled internal combustion engine, the combination of jackets extending alongside the engine cylinders so as to provide a pair of air passages one at each side of the upper ends of the cylinders and a second pair of air passages one at each side of the lower ends of the engine cylinders, and skirts on the jackets extending inwardly from the ends of the engine cylinders so as to direct air from the said air passages longitudinally of the engine cylinders and in contact with the cylinder walls.

3. In an air-cooled internal combustion engine, the combination of jackets extending alongside the engine cylinders so as to provide a pair of air passages one at each side of the upper ends of the cylinders and a second pair of air passages one at each side of the lower ends of the engine cylinders, skirts on the jackets extending inwardly from the ends of the engine cylinders so as to direct air from the said air passages longitudinally of the engine cylinders and in contact with the cylinder walls, and baffles in about the mid-horizontal planes of the cylinders and adapted to cause the said air to escape laterally into the atmosphere between the inner ends of the skirts.

4. In an air-cooled internal combustion engine, the combination of jackets extending alongside the engine cylinders so as to provide a pair of air passages one at each side of the upper ends of the cylinders and a second pair of air passages one at each side of the lower ends of the engine cylinders, fins projecting from the walls of the cylinders, and skirts on the jackets extending inwardly from the ends of the engine cylinders so as to direct air from the said air passages longitudinally of the engine cylinders and in contact with the cylinder walls.

5. In an air-cooled internal combustion engine, the combination of members providing air passages one at each side of the upper ends of the engine cylinders, members providing air passages one at each side of the lower ends of the engine cylinders, sleeves external to the cylinder walls and adapted to direct air from the said air passages longitudinally of the engine cylinders and in contact with the external surfaces of the cylinder walls, and other sleeves extending inside the said walls so as to direct air from the said air passages in contact with the internal surfaces of the cylinder walls.

6. In an air-cooled internal combustion engine, the combination of members providing air passages one at each side of the upper ends of the engine cylinders, members providing air passages one at each side of the lower ends of the engine cylinders, other members providing passages in communication with the said air passages and extending inwardly from the ends of the engine cylinders so as to direct air from the said air passages longitudinally of the engine cylinders and in contact with the cylinder walls, a casing at the front of the engine, a fan within the casing and driven from the said engine, and a baffle behind the fan adapted to direct air into the said air passages.

7. In an air-cooled internal combustion engine, the combination of members providing air passages one at each side of the upper ends of the engine cylinders, members providing air passages one at each side of the lower ends of the engine cylinders, other members providing passages in communication with the said air passages and extending inwardly from the ends of the engine cylinders so as to direct air from the said air passages longitudinally of the engine cylinders and in contact with the cylinder walls, a casing at the front of the engine, a fan within the casing and driven from the said engine, a baffle behind the fan adapted to direct air into the said air passages, and curved guide blades in the casing for directing air onto the fan.

8. In an air-cooled internal combustion engine according to claim 1, a casing in front of the engine cylinders and carrying a fan, means for driving said fan from the engine, guide blades for the air before it reaches said fan, and a hollow baffle positioned behind the said fan, one side of said baffle being constructed to direct air into the air passage and also onto the front part of the foremost engine cylinder, and the other side of said baffle being constructed to receive air from the front of the foremost engine cylinder and to exhaust it into the atmosphere.

9. Air cooling means for an internal combustion engine, comprising a casing at the front of the engine, a fan within said casing, means for driving said fan from the engine, members providing air passages one at each side of the upper and lower ends of the engine cylinders, a baffle behind said fan adapted to direct air into said air passages, and other members providing passages in communication with the said air passages and extending inwardly from the ends of the engine cylinders so as to direct air from the said air passages longitudinally of the engine cylinders and in contact with the cylinder walls.

In testimony where we affix our signatures.
BENJAMIN HOWELL MORGAN.
GEORGE FREDERICK JONES.